The sulfides utilized in the practice of this invention may generally be prepared from more or less concentrated solutions of a soluble salt of the desired metal, such as the metal nitrates, through addition with stirring of a solution of a soluble sulfide, such as ammonium sulfide, or of a gas, such as $H_2S$. Other procedures for the preparation of the sulfide might also be employed. For instance, with arsenous sulfide $As_2S_3$, it is convenient to introduce excess $H_2S$ gas into a dilute solution of a soluble arsenous As(III) salt.

This invention is not limited to the selection or use of any particular reagents or concentrations in the manufacture of the sulfide, so long as the resulting solid particles are permeable to the metal ion to be removed from the solution and have the other characteristics previously described. Indeed, many of the metal sulfides which are useful in the practice of this invention may be purchased commercially.

However obtained, the metal sulfide precipitate may be filtered, washed with water, dried (conveniently at a low temperature such as ambient room temperatures) and then ground and/or sieved to the desired particle size to provide a column with the desired flow characteristics. Generally speaking, in the practice of this invention it is convenient to use particle sizes in the range of 20–200 mesh, particularly for small columns. It will be understood, however, that for any particular uses or practice of the process of this invention it would be appropriate to conduct preliminary tests to determine the optimum particle and column size for the separation under study. Such investigations and determinations are within the skill of those skilled in this art. It is also within the scope of this invention to use some degree of over-pressure on the column to accelerate the flow rates, if desired.

As an indication of bed densities of the columns of sulfides which may be used, a number of columns used in studies of the present invention were prepared for various metal sulfide using the precipitating procedure mentioned above (addition of ammonium sulfide of 0.2 to 0.4 M solutions of metal nitrates; or, in the case of arsenous sulfides, addition of $H_2S$ gas). The particle size was in range of 80–170 mesh. Measured in units of grams per cc. the bed densities were found to be $Ag_2S$:1.5; CuS:1.5; ZnS:1.4; CdS:0.9; PbS:1.6; and $As_2S_3$:0.5. Composition of the solid was taken as being the stoichiometric sulfide after drying it at 105° C. for 24 hours. The weight loss on drying was observed in one experiment to be about 6.7% for zinc sulfide and about 1% for the others of these sulfides.

In the use of columns of the sulfides prepared as just described in a chromatographic-type technique, it has been found possible to achieve the removal of metal ions from solutions which are passed through such columns in a rapid and essentially quantitative manner. In the following discussion, the metal originally present as the solid sulfide will be referred to as the bed metal, or bed metal ion, and the metal ion originally in the solution will be referred to as the displacing metal ion or the displacing metal.

The chemical reaction involved in this process may frequently be approximated by the stoichiometry of the metathetical reaction:

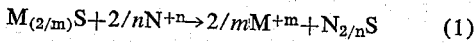

$$M_{(2/m)}S + 2/nN^{+n} \rightarrow 2/mM^{+m} + N_{2/n}S \quad (1)$$

In this equation, $M^{+m}$ is the bed metal ion in the original sulfide and $N^{+n}$ is the displacing metal ion of the solution to be treated, and $m$ and $n$ are the respective valences of the metals.

Taking Equation 1 as representing the reaction, the exchange equivalence of the reaction may be studied and determined through the conversion ratio R, which is the ratio of the number of moles of bed metal ions displaced from the solid sulfide to the number of moles of displacing metal ions which are retained by the column (i.e., adsorbed thereon).

The process of this invention is particularly impressive with respect to the uptake or adsorption of displacing metal ions from the solution by the bed metal sulfides. The moles of metal adsorbed per kilogram of solid sulfide using small (ca. 2 cm.) columns of zinc, cadmium, lead and arsenic sulfides ranged up to 14.5 at 50% breakthrough for the solutions, at the given flow rates, as shown in Table I. Most of these uptakes are enormous compared with standard ion exchange resin capacities. Particularly striking is the uptake achieved with Ag(I) which ranged between about 5 and 20 moles per liter of bed at 50% breakthrough at flow rates greater than 3 cm./min. Indeed, for the reaction of Ag(I) with columns of some of the sulfides in question, flow rates as high as 50 cm./min. were possible without loss of definition of the frontal edge of the adsorption bands. High flow rates were also feasible for Hg(II) with PbS columns and with Cu(II) with CdS and PbS columns. Except with $As_2S_3$, these uptakes with silver correspond to substantially more than 50% of the value which would be expected for the displacement reaction Equation 1. For $As_2S_3$, the lower value implies that the final compound formed was the case with columns of sulfides of zinc, cadmium and lead.

These extremely large uptakes indicate that the process of this invention includes reaction with the bulk of the column particles and cannot be limited to a reaction occurring only on the surface of the particle. While the possibility of conversion must depend on the relative stability of the sulfides (bed metal sulfides vs. displacing metal sulfides), neither the rate of the reaction nor the completeness of the conversion of the column seems to be related to the relative solubilities of the respective sulfides. It is preferred to select the bed metal sulfide with consideration of the nature of the displacing metal ion so that at 50 percent breakthrough the adsorption reaction will be at least 20 percent, still more preferably 40 percent of complete conversion. More specifically, it is preferred to select the bed metal sulfide from those capable of reacting by substitution of its metal with the metal ion in solution to an extent equal to at least about 20% of the metal in said metal sulfide within about ½ hour at about room temperature.

The rate of diffusion of the displacing ions through the sulfide layers must be an important factor in determining the rates of reaction of these materials. Part of the explanation as to how the Ag(I) reacts so surprisingly fast with the sulfides studied may well be related to the very high self-diffusion coefficient for Ag(I) in $Ag_2S$. Pechanski has reported this coefficient as $1.4 \times 10^{-9}$ cm.²/sec. which is a factor of $10^{10}$ greater than for $S^{-2}$ (J. Chem. Phys., volume 47, pages 933–941 (1950)).

Other factors which may affect the reaction rates of the materials are crystallite size and structure. The crystallite sizes were determined for a number of solid sulfides, as precipitated and dried at 25° C., and for some of the sulfides after treatment with a displacing metal ion-containing solution. The results of these determinations are summarized in Table 2, and it will be seen that the rates of adsorption do not appear to correlate in any direct or obvious way with the crystallite sizes or structure of the sulfides. For instance, although the zinc sulfide crystallite size is smaller than that of cadmium sulfide, the rates of conversion for Ag(I), Cu(II) and Hg(II) were all more rapid with cadmium sulfide. Similarly, since zinc sulfide and cadmium sulfide may belong to the same zinc blende type of structure, it might be expected that mercury would react with them in about the same manner. However, the experimental results show that Hg(II) was adsorbed on zinc sulfide to a degree less than 5 percent at 50 percent breakthrough, while Hg(II) was adsorbed on a similar sized column of cadmium sulfide to a degree of about 64 percent at 50 percent breakthrough, and at a flow rate nearly 20 times as fast.

TABLE 1.—UPTAKE OF A NUMBER OF METALS BY VARIOUS SULFIDES

| Sulfide | Metal ion | Flow Rate (cm./min.) | Uptake at 50% Breakthrough | | | |
|---|---|---|---|---|---|---|
| | | | Moles/kg. | Moles per l/bed | Moles per mole $M_xS_y$ | Percent of theoretical |
| Zn | Ag (I) | 7 | 14.5 | 20.3 | 1.4 | 71 |
| | Cu (II) | 4 | 6.6 | 9.3 | 0.6 | 65 |
| | Hg (II) | 0.3 | 0.5 | 0.8 | 0.05 | 5 |
| Cd | Ag (I) | 3 | 13.5 | 12.1 | 1.95 | 97.5 |
| | Cu (II) | 5 | 4.8 | 4.3 | 0.7 | 69 |
| | Hg (II) | 2 | 4.4 | 4.0 | 0.6 | 64 |
| | Au (III) | 3 | 3.6 | 3.2 | 0.5 | 78 |
| Pb | Ag (I) | 5 | 7.1 | 11.4 | 1.7 | 85 |
| | Cu (II) | 5 | 1.8 | 2.9 | 0.4 | 43 |
| | Hg (II) | 5 | 4.2 | 6.7 | 1.0 | 98 |
| As | Ag (I) | 7 | 11.1 | 5.5 | 2.7 | 46 |
| | Cu (II) | 3 | 0.9 | 0.5 | 0.2 | 7 |
| | Hg (II) | 4 | 2.1 | 1.1 | 0.5 | 17 |
| Cu | Ag (I) | 0.3 | 3.2 | 4.9 | 0.3 | 15 |
| | Hg (II)* | 0.9 | 3.3 | 5.0 | 0.3 | 32 |
| Ag | Hg (II) | 1 | 5.1 | 7.8 | 1.3 | 128 |

*Measured at 97° C.

TABLE 2.—STRUCTURE AND APPROXIMATE CRYSTALLITE SIZE FOR SULFIDES BEFORE AND AFTER CONVERSION

| Sulfide | Structure (initial) | Crystallite Size, (initial) | Converting Ion | Structure (final) | Crystallite Size, (final) |
|---|---|---|---|---|---|
| Zn (II) | Zinc-blende | 30 | Ag | Monoclinic | 430 |
| | | | Ag | do | 550 |
| Cd (II) | do | 69 | Cu | Hexagonal | 234 |
| Pb (II) | Sodium Chloride | 215 | Ag | Monoclinic | 470 |
| As (III) | Amorphous | 20 | Ag | do | 360 |

The data in Table 2 do show that the crystallite sizes of the sulfides after treatment were many times larger than those of the original sulfide. This would imply that the initial materials are largely amorphous, though perhaps with crystalline "centers," and that the amorphous regions are relatively continuous over hundreds of Angstrom units. During the reaction, most of the largely amorphous particle is presumably transformed to a more crystalline particle.

EXAMPLES

The following examples are provided to illustrate further the invention but obviously the invention is not limited to the specific reactions or procedures set forth.

*Example 1*

In an experiment with a silver sulfide column, a mercuric ion solution (.053 M Hg(NO₃)₂–0.0002 M HNO₃) was used. In a typical adsorption and displacement experiment, carried out at a flow rate of 1 cm./min. and with a small column (ca. 0.2 cm.² x 1–2 cm.) at a temperature of 25° C., the conversion ratio R is something less than 2. According to Equation 1, elution of 2 moles of silver ion per mole of mercuric ion adsorbed would have been expected. This indicates the reaction of the process of the present invention does not necessarily proceed exactly according to the postulated metathetical equation. Rather, in this case, it may be that there was some adsorption of excess mercuric ion on the mercuric sulfide from the column, or there may have been some adsorption of silver ion on the mercuric sulfide. Both reactions would appear to be possible.

In any event, however, a very rapid quantitative removal of mercuric ion from the solution was achieved, with at least partial displacement of silver ion.

*Example 2*

Using a cupric sulfide column, prepared as described above, further experiments were conducted using silver and mercuric ions. With the Ag(I) ion solution (0.098 M AgNO₃–0.1 M HNO₃), a flow rate of 0.3 cm./min. at a temperature of 25° C. was maintained through a column of the dimensions used in Example 1. Cupric ions were observed in the effluent solution quite rapidly, and the conversion ratio R was 0.5 in accordance with Equation 1.

The rate of adsorption of mercuric ion by the cupric sulfide columns was somewhat slower at room temperature. At 97° C., essentially quantitative adsorption of Hg(II) from a solution of 0.053 M Hg(NO₃)₂–2×10⁻⁴ M HNO₃ concentration occurred for various columns, and using a flow rate of 0.9 cm./min. The conversion ratio R was approximately 0.5, substantially less than would be expected from Equation 1. It also appeared to be dependent on flow rate. It is possible the mercuric sulfide acted as an adsorbent for excess mercuric ion. This may be due at least in part to the formation of double salts of the type $$2Hg_2S \cdot HgX_2$$

(where X is an anion such as nitrate). These double salts are known to be white, and it was observed during the experiments that the columns would slowly change in color from black to grey.

These results indicate, however, that displacement of the bed metal was the reaction involved in the adsorption of approximately half of the Hg(II) removed from the solution. The total removal of mercury was substantially quantitative corresponding to the result observed in the first two experiments described above.

*Example 3*

ZnS: Silver ions are quantitatively retained (or adsorbed) by a ZnS column; a black band is formed which has a sharp frontal edge at reasonable flow rates. Although some Zn(II) appeared immediately in the effluent, the conversion ratio R only gradually approached the theoretical value predicted from Equation 1. In a typical experiment with a .048 M AgNO₃–1 M NaNO₃–0.001 M HNO₃ solution at a temperature of 25° C. and a flow rate of 5 cm./min., there was apparently some retention of displaced Zn(II), perhaps through reaction with some excess sulfide incorporated in the precipitate.

Removal of Cu(II) from solution by adsorption on ZnS was tested with nitrate solutions. A typical experiment involved addition of .052 M Cu(NO₃)₂–0.004 M HNO₃ at a flow rate of ca. 5 cm./min. at a temperature of 25° C. Conversion was rapid; on addition of the Cu(II) solution a black band with a sharp frontal edge formed. Although some Zn(II) appeared immediately in the effluent the conversion ratio, as in the case of adsorption of Ag(I), only slowly approached the theoretical value ($R=1$).

Adsorption of Hg(II) by ZnS seems more complicated. Tests were carried out with ca. 0.053 M $Hg(NO_3)_2$–0.0002 M $HNO_3$ solutions at 25° C. Under these conditions Hg(II) breakthrough occurred after 10 column volumes at a flow rate of only 0.3 cm./min. The column underwent a series of color changes (orange to black to grey) implying that a variety of compounds are formed. At elevated temperatures (97° C.) these color changes were faster but Hg(II) still broke through after approximately 10 column volumes. Effluent analyses at both temperatures yielded very low values of R (ca. 0.1), presumably because of a combination of Zn(II) adsorption on the ZnS and Hg(II) adsorption on the HgS produced.

Example 4

Cadminum sulfide was prepared by addition, with continuous stirring, of excess ammonium sulfide to a 0.2 M cadmium nitrate solution. The resulting precipitate was collected by filtration and washed with water, 0.2 M $HNO_3$, and again with water. The material was dried at 25° C., ground and sieved (mesh size, 80–170). This sieved material gave columns which have good flow characteristics. The columns had a cross-sectional area of ca. 0.2 cm.$^2$ and were ca. 2 cm. high. X-ray crystallographic examination of the material revealed only lines of the cubic CdS; the crystallite size was about 90 A.

When dilute (e.g. tracer) or concentrated (e.g., 1 M) solutions of silver, copper or mercury nitrates, with or without supporting electrolyte ($NaNO_3$, $HNO_3$), were passed through columns of cadmium sulfide, quantitative removal of the ions from the solution was obtained as determined by radiometric analysis of the effluent ($Ag^{110}$, $Hg^{203}$, $Cu^{64}$). The adsorption reaction is insensitive to the anions present in the solution; in the case of Ag(I) (0.05 M), excellent adsorption was found even from 0.1 M $Na_2S_2O_3$ in which Ag(I) is strongly complexed.

Absorption of these ions by cadmium sulfide might be expected to result principally from displacement reactions of the type of Equation 1. To establish the stoichiometry of the reaction, a series of column experiments was carried out with 0.050 M $AgNO_3$–1.0 M $NaNO_3$, 0.052 M $Cu(NO_3)_2$–0.004 M $HNO_3$ and 0.050 M $Hg(NO_3)_2$. The effluent was analyzed for Cd(II) by EDTA titrations while absence of the other heavy metal ions was confirmed radiometrically. Except for a slight delay in Cd(II) breakthrough, the reaction with Ag(I) and Cu(II) follows Equation 1 quantitatively. With Hg(II), the effluent Cd(II) concentration was substantially less than expected from Equation 1.

Qualitatively, excess adsorption of Hg(II) over that expected from Equation 1 would be expected if there is at least partial formation of double salts of the type $(HgS)_n \cdot HgX_2$. White double salts with composition $(HgS)_2 \cdot HgX_2$ are well known. Treatment of CdS and HgS columns with excess of Hg(II) solutions yielded white or gray solids, suggesting formation of such double salts. However, the amount of Hg(II) adsorbed by CdS in the experiment described above is in excess of that expected for formation of $(HgS)_2 \cdot Hg(NO_3)_2$; perhaps basic double salts containing a still larger Hg/S ratio are formed.

The reaction between CdS and the heavy metal ions often goes essentially to completion under the usual conditions of column operation. Thus, silver uptake as high as 13.2 moles per kilogram of CdS was achieved with a 0.21 cm.$^2$ × 1.45 cm. CdS column with 0.05 M $AgNO_3$–1 M $NaNO_3$–0.001 M $HNO_3$ at a flow rate of 5 cm./min. This uptake is equivalent to a 94% conversion to $Ag_2S$. Conversion to CuS is somewhat slower; at the same flow rate using a similar column and 0.052 M $Cu(NO_3)_2$– 0.004 M $HNO_3$, 4.7 moles of Cu(II) was adsorbed per kg. at 50% breakthrough, which is equivalent to 70% of theoretical (6.92 moles per kg.).

The extreme rapidity with which the adsorption-displacement reactions proceed is probably the most striking feature in the chromatographic application of CdS. Thus, using 0.05 M Ag(I) and Cu(II) solutions, quantitative adsorption was found with 2 to 3 cm. columns at flow rates up to 50 cm./min. During the adsorption, a color change occurs from orange to black; the boundary remains remarkably sharp at flow rates as high as 25 cm./min. With Hg(II) the reactions are more complicated and not quite as fast. A red HgS, which often forms first, slowly converts to the black sulfide and it in turn converts still more slowly (at room temperature) to the white double salts.

Cadmium sulfide, in view of its high capacity, applicability to dilute and concentrated solutions, and very favorable exchange kinetics, thus seems to be a very useful material for the recovery of a large number of heavy metals which form insoluble sulfides.

In further experiments with CdS columns, Au(III) was found to react quantitatively with CdS to give a black band with sharp frontal edge. Displaced Cd(II) appeared immediately in the effluent. The value for the conversion ratio, R increased to about 1.1 after 19 column volumes. Addition of more Au(III) was accompanied by a gradual decrease in R until after about 60 column volumes it approached an asymptotic value of 0.80. Presumably some of the Au(III) was retained by side reactions. At 50 percent breakthrough uptake corresponded to 78 percent of theoretical. In other experiments with CdS columns good adsorption was also found for platinum and bismuth.

Example 5

PbS: Reaction of PbS with Ag(I) and Hg(II) was found to be rapid and quantitative with small columns. The conversion ratios for Ag(I) and Cu(II) rapidly approached the theoretical values of 0.5 and 1 respectively for 0.048 M $AgNO_3$–1 M $NaNO_3$–0.001 M $HNO_3$ and 0.052 M $Cu(NO_3)_2$–0.004 M $HNO_3$ solutions. The conversion ratio R in the case of Hg(II) (0.053 M $Hg(NO_3)_2$–0.0002 M $HNO_3$) was close to unity for the first 40 column volumes and then decreased to ca. 0.65. The color of the column slowly turned grey, presumably because of slow formation of the double salt

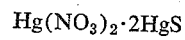

$Hg(NO_3)_2 \cdot 2HgS$

Example 6

Arsenic Sulfide: Addition of Ag(I) (0.048 M $Ag(NO_3)_2$–1 M $NaNO_3$–0.001 M $HNO_3$) caused quantitative and rapid adsorption; a black band with sharp frontal edge formed. After a few column volumes the conversion ratio reached the asymptotic value 0.33 as expected from Equation 1. While addition of Cu(II) [0.052 M $Cu(NO_3)_2$–0.004 M $HNO_3$] yielded a well defined dark band with sharp frontal edge at a flow rate of 3 cm./min.. The extent of the reaction was small and copper breakthrough occurred after ca. 7 column volumes. Arsenic appeared immediately in the effluent and reached an apparently asymptotic value $R=0.75$ after 3 column volumes. It is not clear why this value is larger than the theoretical value of 0.67 expected from Equation 1.

With Hg(II) [0.053 M $Hg(NO_3)_2$–0.0002 M $HNO_3$], removal was quantitative only for 22 column volumes at a flow rate of 4 cm./min. There was no significant color change at first. Only after 4 months did the column turn black. The conversion ratio R was ca. 0.3—i.e., less than half the value predicted from Equation 1.

Example 7

Iron sulfide: A sample of iron sulfide was prepared through addition of excess ammonium sulfide solution to an acidified ca. 0.2 M ferric chloride solution. The resulting precipitate was washed, air-dried and sieved (80–170 mesh). A 1.5 cm. x 0.2 cm.² column (0.3 cc.) containing this material was treated with 0.05 M AgNO₃ solution. Silver was retained essentially quantitatively for more than 80 column volumes at a flow rate of 3 cm./min. The experiment was discontinued after a total of 100 column volumes of the AgNO₃ solution had been passed through. At this point, the silver concentration in the effluent was still less than 20% of the inflowing concentration. The column was loaded with silver to an extent of ca. 5 moles per liter of bed; this corresponds also to ca. 5 moles of silver per kg. adsorbent since the bed density was ca. 1 kg. per liter. During the adsorption reaction iron appeared in the effluent; however, no attempt was made to establish quantitatively the ratio of iron released to silver adsorbed.

A similar series of experiments was carried out with an iron sulfide prepared from an acidified ferrous chloride solution (0.2 M) through addition of excess ammonium sulfide solution. The precipitate was washed, dried at room temperature and sieved. A series of experiments was carried out in a manner analogous to those described in the previous paragraph using a small column, 0.05 M silver nitrate solution. At 50% breakthrough ca. 6 moles of silver were adsorbed per liter of bed. The bed density was ca. 1 kg. per liter. Iron was observed in the effluent by qualitative tests.

It will be appreciated that the foregoing processes of these examples may also be conducted by techniques other than those described. For example, it is also possible to conduct such reactions by removing at predetermined time intervals a predetermined depth from one end of the column (and adding a like quantity of fresh metal sulfide to the other end). By means of such a technique, an essentially pure product could be readily obtained after a short rinse. Still other techniques will suggest themselves to those skilled in the art without departing from the spirit of the present invention.

It will be appreciated that throughout the practice of this invention the insoluble metal sulfides are employed as such, and preferably without any carriers or supports therewith. As previously indicated, however, diluents or supports may be employed provided the particulate body containing the metal sulfide contains at least 1 mole of metal sulfide per liter of particulate body.

This invention thus provides a process wherein sulfides of such metals as silver, copper, zinc, lead, cadmium, iron and arsenic, in pervious particulate form, "adsorb" metal ions which form insoluble sulfides from solutions containing macro amounts of such ions. The process apparently proceeds at least in part through a metathetical reaction in which the bed metal of the sulfide is displaced by the displacing metal ion of the solution. The reactions are usually fast and flow rates of several cm./min. can be tolerated even with small columns.

It is to be noted that some of the claims appended hereto exclude the use of cadmium sulfide when Cu(II) ions are involved, others exclude Cu(II) ions as such, and still others exclude Cu(II) ions by restricting the solutions containing the metal ions to those containing ions of metals having an atomic number greater than 29. These exclusionary clauses have been introduced into the claims to avoid even the possibility of conflict with prior art teachings such as those previously identified, none of which teaches or anticipates the broad concepts to which any of the claims are directed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A chromatographic process for the removal of a metal ion from a solution containing the same, said metal ion being selected from Ag(I), Cu(II), Hg(II) and Au(III), which comprises bringing said solution into intimate contact with a particulate body consisting essentially of a solid metal sulfide which is substantially insoluble in said solution, said metal sulfide being selected from zinc, cadmium, lead, arsenic, copper, iron and silver sulfides, said metal sulfide being other than cadmium sulfide when said metal ion is Cu(II), said particulate body containing at least 1 mole of metal sulfide per liter of particular body, said solid metal sulfide having a solubility in said solution greater than the solubility of the sulfide of the metal ion in said solution, said solid metal sulfide being permeable to said metal ion, said solid metal sulfide being capable of reacting by substitution of its metal with said metal ion to an extent equal to at least about 20% of the metal in said metal sulfide within about ½ hour at about room temperature, said particulate body being employed in the form of a chromatographic column with said solution being brought into contact with said particulate body by passage through said column; controlling said contacting of said solution with said particulate body so as to cause at least a portion of said metal ions to diffuse into at least a portion of the interior of said solid metal sulfide particles, whereby the insoluble sulfide of said metal ion is formed with displacement of the metal from said solid metal sulfide; and thereafter removing at least a portion of the resulting body of sulfide particles from contact with said solution.

2. A chromatographic process for the removal of silver ions from a solution containing the same which comprises bringing said solution into intimate contact with a particulate body containing zinc sulfide, said particulate body consisting essentially of at least 1 mole of zinc sulfide per liter of particulate body, said zinc sulfide being permeable to said silver ions; said zinc sulfide being capable of reacting by substitution of its metal with said silver ions to an extent equal to at least about 20% of the zinc in said zinc sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said zinc sulfide, whereby silver sulfide is formed with displacement of the zinc from said zinc sulfide; and thereafter removing at least a portion of the resulting body of sulfide particles from contact with said solution.

3. A chromatographic process for the removal of silver ions from a solution containing the same which comprises bringing said solution into intimate contact with a particulate body containing cadmium sulfide, said particulate body consisting essentially of at least 1 mole of cadmium sulfide per liter of particulate body, said cadmium sulfide being permeable to said silver ions; said cadmium sulfide being capable of reacting by substitution of its metal with said silver ions to an extent equal to at least about 20% of the cadmium in said cadmium sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said cadmium sulfide, whereby silver sulfide is formed with displacement of the cadmium from said cadmium sulfide; and thereafter removing at least a portion of the resulting body of sulfide particles from contact with said solution.

4. A chromatographic process for the removal of silver ions from a solution containing the same which comprises bringing said solution into intimate contact with a particulate body containing lead sulfide, said particulate body consisting essentially of at least 1 mole of lead sulfide per liter of particulate body, said lead sulfide being permeable to said silver ions; said lead sulfide being capable of reacting by substitution of its metal with said silver ions to an extent equal to at least about 20% of the lead in said lead sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said lead sulfide, whereby silver sulfide is formed with displacement of the lead from said lead sulfide; and thereafter removing at least a portion of the resulting body of sulfide particles from contact with said solution.

5. A chromatographic process for the removal of silver ions from a solution containing the same which comprises bringing said solution into intimate contact with a particulate body containing arsenic sulfide, said particulate body consisting essentially of at least 1 mole of arsenic sulfide per liter of particulate body, said arsenic sulfide being permeable to said silver ions; said arsenic sulfide being capable of reacting by substitution of its metal with said silver ions to an extent equal to at least about 20% of the arsenic in said arsenic sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said arsenic sulfide, whereby silver sulfide is formed with displacement of the arsenic from said arsenic sulfide; and thereafter removing at least a portion of the resulting body of sulfide particles from contact with said solution.

6. A chromatographic process for the removal of silver ions from a solution containing the same which comprises bringing said solution into intimate contact with a particulate body containing copper sulfide, said particulate body consisting essentially of at least 1 mole of copper sulfide per liter of particulate body, said copper sulfide being permeable to said silver ions; said copper sulfide being capable of reacting by substitution of its metal with said silver ions to an extent equal to at least 20% of the copper in said copper sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said copper sulfide, whereby silver sulfide is formed with displacement of the copper from said copper sulfide; and thereafter removing at least a portion of the resulting body of sulfide particles from contact with said solution.

7. A chromatographic process for the removal of silver ions from a solution containing the same which comprises bringing said solution into intimate contact with a particulate body containing iron sulfide, said particulate body consisting essentially of at least 1 mole of iron sulfide per liter of particulate body, said iron sulfide being permeable to said silver ions; said iron sulfide being capable of reacting by substitution of its metal with said silver ions to an extent equal to at least about 20% of the iron in said iron sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said iron sulfide, whereby silver sulfide is formed with displacement of the iron from said iron sulfide; and thereafter removing at least a portion of the resulting body of sulfide particles from contact with said solution.

8. A chromatographic process for the removal of Hg(II) ions from a solution containing the same which comprises bringing said solution into intimate contact with a particulate body containing cadmium sulfide, said particulate body consisting essentially of at least 1 mole of cadmium sulfide per liter of particulate body, said cadmium sulfide being permeable to said Hg(II) ions; said cadmium sulfide being capable of reacting by substitution of its metal with said Hg(II) ions to an extent equal to at least about 20% of the cadmium in said cadmium sulfide within about ½ hour at about room temperature, said particulate body being employed in the form of a chromatographic column with said solution being brought into contact with said particulate body by passage through said column; controlling said contacting of said solution with said particulate body so as to cause at least a portion of said Hg(II) ions to diffuse into at least a portion of the interior of said cadmium sulfide, whereby mercuric sulfide is formed with displacement of the cadmium from said cadmium sulfide; and thereafter removing at least a portion of the resulting body of sulfide particles from contact with said solution.

9. A chromatographic process for the removal of Hg(II) ions from a solution containing the same which comprises bringing said solution into intimate contact with a particulate body containing lead sulfide, said particulate body consisting essentially of at least 1 mole of lead sulfide per liter of particulate body, said lead sulfide being permeable to said Hg(II) ions; said lead sulfide being capable of reacting by substitution of its metal with said Hg(II) ions to an extent equal to at least about 20% of the lead in said lead sulfide within about ½ hour at about room temperature, said particulate body being employed in the form of a chromatographic column with said solution being brought into contact with said particulate body by passage through said column; controlling said contacting of said solution with said particulate body so as to cause at least a portion of said Hg(II) ions to diffuse into at least a portion of the interior of said lead sulfide, whereby mercuric sulfide is formed with displacement of the lead from said lead sulfide; and thereafter removing at least a portion of the resulting body of sulfide particles from contact with said solution.

10. A chromatographic process for the removal of Au(III) ions from a solution containing the same which comprises bringing said solution into intimate contact with a particulate body containing cadmium sulfide, said particulate body consisting essentially of at least 1 mole of cadmium sulfide per liter of particulate body, said cadmium sulfide being permeable to said Au(III) ions; said cadmium sulfide being capable of reacting by substitution of its metal with said Au(III) ions to an extent equal to at least about 20% of the cadmium in said cadmium sulfide within about ½ hour at about room temperature, said particulate body being employed in the form of a chromatographic column with said solution being brought into contact with said particulate body by passage through said column; controlling said contacting of said solution with said particulate body so as to cause at least a portion of said Au(III) ions to diffuse into at least a portion of the interior of said cadmium sulfide, whereby gold sulfide is formed with displacement of the cadmium from said cadmium sulfide; and thereafter removing at least a portion of the resulting body of sulfide particles from contact with said solution.

11. A chromatographic process for the removal of silver ions from a photographic fixer solution which comprises bringing said solution into intimate contact with a particulate body consisting essentially of a solid metal sulfide material which is substantially insoluble in said solution and which is selected from zinc, cadmium, lead, arsenic, iron and copper sulfides, said particulate body containing at least 1 mole of metal sulfide per liter of particulate body, said metal sulfide having a solubility in said solution greater than the solubility of silver sulfide in said solution, said metal sulfide being permeable to said silver ions, said metal sulfide being capable of reacting by substitution of its metal with said silver ions to an extent equal to at least about 20% of the metal in said metal sulfide within about ½ hour at about room temperature, said particulate body being employed in the form of a chromatographic column with said solution being brought into contact with said particulate body by passage through said column; controlling said contacting of said solution with said particulate body so as to cause at least a portion of said silver ions to diffuse into at least a portion of the interior of said metal sulfide, whereby silver sulfide is formed with displacement of the metal from said metal sulfide; and thereafter removing at least a portion of the resulting body of sulfide particles from contact with said solution.

12. A chromatographic process for the removal of a metal ion from a solution containing the same, said metal ion being selected from Ag(I), Cu(II), Hg(II) and Au(III), which comprises bringing said solution into intimate contact with a particulate body in the form of particles of at least about 200 mesh and consisting essentially of a solid metal sulfide which is substantially insoluble in said solution, said metal sulfide being selected from zinc, cadmium, lead, arsenic, copper, iron and silver sulfides, said metal sulfide being other than cadmium sulfide when said metal ion is Cu(II), said particulate body containing at least 1 mole of metal sulfide per liter of particulate body, said solid metal sulfide having a solubility in said solution greater than the solubility of the sulfide of the metal ion in said solution, said solid metal sulfide being permeable to said metal ion, said solid metal sulfide being capable of reacting by substitution of its metal with said metal ion to an extent equal to at least about 20% of the metal in said metal sulfide within about ½ hour at about room temperature, said particulate body being employed in the form of a chromatographic column with said solution being brought into contact with said particulate body by passage through said column; controlling said contacting of said solution with said particulate body so as to cause at least a portion of said metal ions to diffuse into at least a portion of the interior of said solid metal sulfide particles, whereby the insoluble sulfide of said metal ion is formed with displacement of the metal from said solid metal sulfide; and thereafter removing at least a portion of the resulting body of sulfide particles from contact with said solution.

13. A chromatographic process for the removal of a metal ion from a solution containing the same, said metal ion being selected from Ag(I), Cu(II), Hg(II) and Au(III), which comprises bringing said solution into intimate contact with a particulate body in the form of particles in the range of about 20–200 mesh and consisting essentially of a solid metal sulfide which is substantially insoluble in said solution, said metal sulfide being selected from zinc, cadmium, lead, arsenic, copper, iron and silver sulfides, said metal sulfide being other than cadmium sulfide when said metal ion is Cu(II), said particulate body containing at least 1 mole of metal sulfide per liter of particulate body, said solid metal sulfide having a solubility in said solution greater than the solubility of the sulfide of the metal ion in said solution, said solid metal sulfide being permeable to said metal ion, said solid metal sulfide being capable of reacting by substitution of its metal with said metal ion to an extent equal to at least about 20% of the metal in said metal sulfide within about ½ hour at about room temperature, said particulate body being employed in the form of a chromatographic column with said solution being brought into contact with said particulate body by passage through said column; controlling said contacting of said solution with said particulate body so as to cause at least a portion of said metal ions to diffuse into at least a portion of the interior of said solid metal sulfide particles, whereby the insoluble sulfide of said metal ion is formed with displacement of the metal from said solid metal sulfide; and thereafter removing at least a portion of the resulting body of sulfide particles from contact with said solution.

References Cited by the Examiner

UNITED STATES PATENTS

| | | | |
|---|---|---|---|
| 935,337 | 9/1909 | Thwaites | 75—108 |
| 1,069,205 | 8/1913 | Thwaites | 75—117 |
| 2,011,739 | 8/1935 | Teats | 75—109 |
| 2,079,597 | 5/1937 | Allingham | 75—109 |
| 2,726,141 | 12/1955 | Appell | 75—101 |
| 2,735,795 | 2/1956 | Weiss et al. | 23—210 |
| 2,753,258 | 7/1956 | Burstall et al. | 210—31 |
| 2,813,781 | 11/1957 | Mertes | 23—310 |
| 2,850,439 | 9/1958 | Bodkin | 23—310 |
| 2,960,400 | 11/1960 | Reynaud et al. | 75—109 |
| 3,072,567 | 1/1963 | Evans et al. | 23—310 |
| 3,092,515 | 6/1963 | Pike et al. | 23—310 |
| 3,117,000 | 1/1964 | Schlain et al. | 75—108 |
| 3,252,765 | 5/1966 | De Lara et al. | 23—310 |

OTHER REFERENCES

Phillips et al.: "Adsorption on Inorganic Materials (V) Reaction of Cadmium Sulfide with Copper (II), Mercury (II) and Silver (I)," Journal of the American Chemical Society, vol. 85, Feb. 20, 1963, pages 486–487.

"Adsorption on Inorganic Materials," ORNL–3488, UC–4 Chemistry, TID–5400 (22nd ed.), received in Scientific Library of the U.S. Patent Office on Oct. 31, 1963, pages 84–88.

DAVID L. RECK, *Primary Examiner.*

N. F. MARKVA, *Assistant Examiner.*

UNITED STATES PATENT OFFICE
CERTIFICATE OF CORRECTION

Patent No. 3,317,312                          May 2, 1967

Kurt A. Kraus et al.

It is hereby certified that error appears in the above numbered patent requiring correction and that the said Letters Patent should read as corrected below.

Column 1, line 63, for "222" read -- 122 --; column 6, line 22, after "was" insert -- $Ag_3AsS_3$ rather than $Ag_2S$, which seems to be formed in --; column 9, line 20, for "Cadminum" read -- Cadmium --; line 42, for "Absorption" read -- Adsorption --.

Signed and sealed this 25th day of June 1968.

(SEAL)
Attest:

Edward M. Fletcher, Jr.                      EDWARD J. BRENNER
Attesting Officer                           Commissioner of Patents

UNITED STATES PATENT OFFICE

CERTIFICATE OF CORRECTION

Patent No. 3,317,312                        May 2, 1967

Kurt A. Kraus et al.

It is hereby certified that error appears in the above numbered patent requiring correction and that the said Letters Patent should read as corrected below.

Column 1, line 63, for "222" read -- 122 --; column 6, line 22, after "was" insert -- $Ag_3AsS_3$ rather than $Ag_2S$, which seems to be formed in --; column 9, line 20, for "Cadminum" read -- Cadmium --; line 42, for "Absorption" read -- Adsorption --.

Signed and sealed this 25th day of June 1968.

(SEAL)
Attest:

Edward M. Fletcher, Jr.                        EDWARD J. BRENNER

Attesting Officer                               Commissioner of Patents